United States Patent
Zittlau

(12) 
(10) Patent No.: US 6,254,198 B1
(45) Date of Patent: Jul. 3, 2001

(54) METHOD AND CIRCUIT CONFIGURATION FOR CONTROLLING THE BRAKING PROCESS IN A MOTOR VEHICLE

(75) Inventor: Dirk Zittlau, Stöckelsberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/275,827

(22) Filed: Mar. 25, 1999

(30) Foreign Application Priority Data

Mar. 25, 1998 (DE) ............................................. 198 13 194

(51) Int. Cl.$^7$ ...................................................... B60T 8/34
(52) U.S. Cl. ............................................. 303/113.4; 303/3
(58) Field of Search ............................. 303/113.4, 3, 12, 303/15, 115.1, 122, 155

(56) References Cited

U.S. PATENT DOCUMENTS

| 5,072,393 | 12/1991 | Mori et al. . |
| 5,669,679 | 9/1997 | Hammoud et al. . |
| 5,941,608 | * 8/1999 | Campau ............................ 303/113.4 |
| 6,079,801 | * 6/2000 | Zittlau ................................. 303/150 |

FOREIGN PATENT DOCUMENTS

| 38 06 213 c2 | 3/1992 | (DE) . |
| 195 29 664 A1 | 2/1997 | (DE) . |
| 195 30 735 A1 | 2/1997 | (DE) . |
| 0 644 836 B1 | 10/1996 | (EP) . |
| 1 346 678 | 2/1974 | (GB) . |

* cited by examiner

Primary Examiner—Christopher P. Schwartz
Assistant Examiner—C. T. Bartz
(74) Attorney, Agent, or Firm—Herbert L. Lerner; Laurence A. Greenberg; Werner H. Stemer

(57) ABSTRACT

The wheel speeds are measured and are transmitted to a control unit. The control unit calculates the wheel slip from the wheel speeds and determines a continuous correction value for the setpoint value of the wheel brake pressure from the wheel slip. Using the thus determined correction value, the setpoint value of the wheel brake pressure is continuously changed as a function of the wheel slip. The control unit contains an arithmetic circuit which determines the correction value for the setpoint value of the brake pressure from the wheel slip.

7 Claims, 2 Drawing Sheets

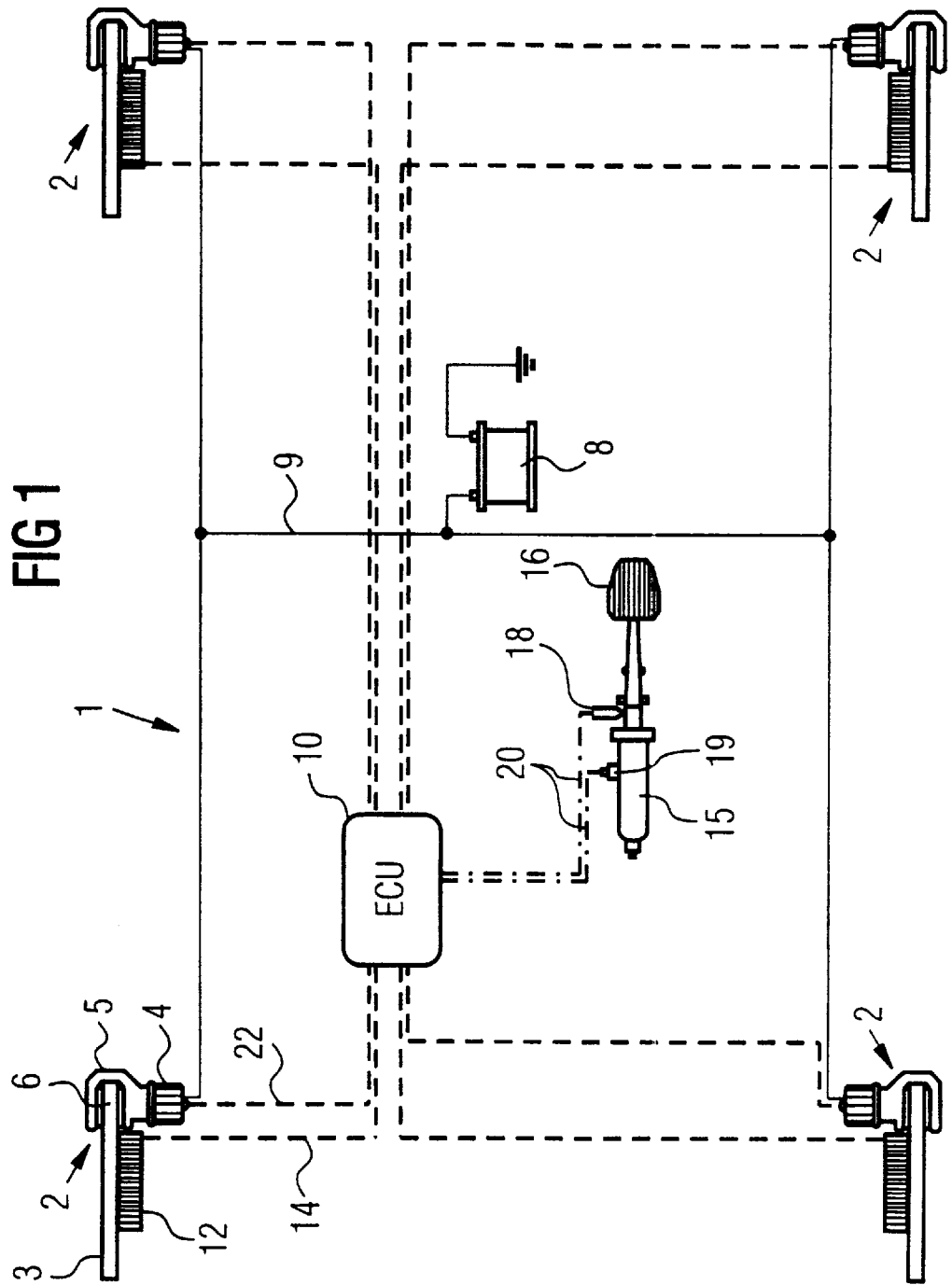

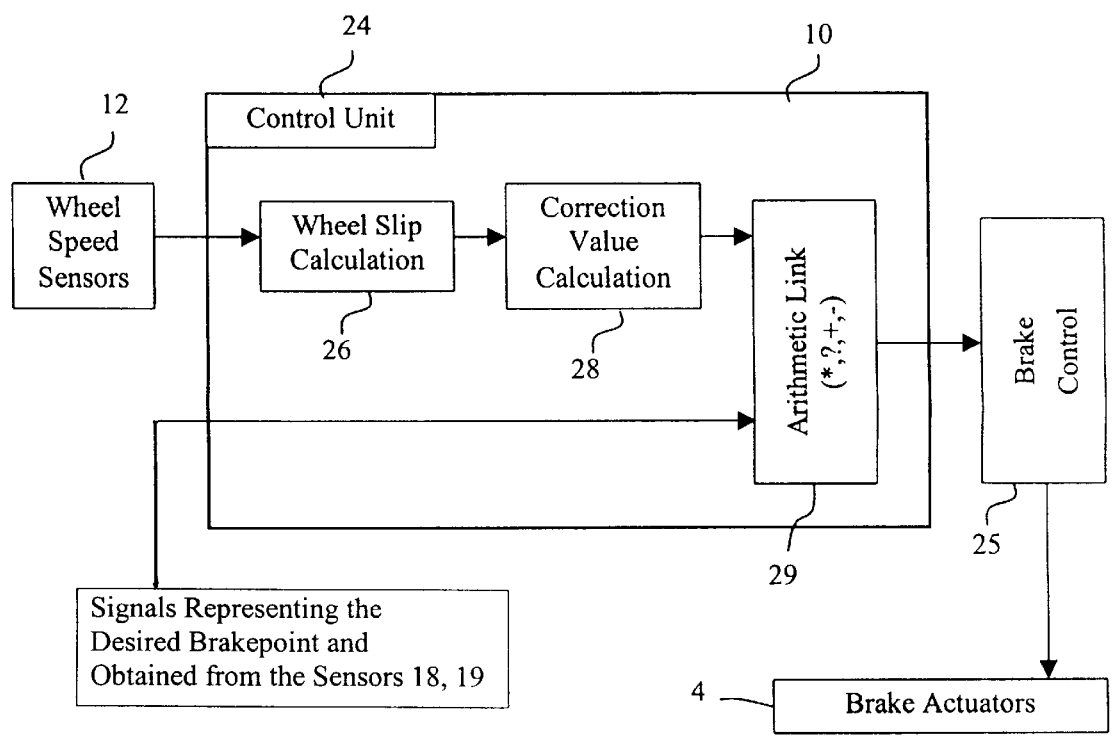

METHOD AND CIRCUIT CONFIGURATION FOR CONTROLLING THE BRAKING PROCESS IN A MOTOR VEHICLE

BACKGROUND OF THE INVENTION

Field of the Invention

The invention lies in the automotive arts. Specifically, the invention pertains to a method and a corresponding circuit for controlling the braking process in a motor vehicle.

State of the art braking systems with the anti-lock brake feature (e.g. European patent EP 0 644 836 B1) control the brake pressure of the individual wheels of a motor vehicle in such a way that the wheels are prevented from locking during braking. The steerability of the motor vehicle is thus maintained in that the wheel brake pressure is adapted to the respective frictional adhesion of the tire to the road surface. That adaptation is carried out by virtue of the fact that when unacceptably high slip occurs the brake pressure which acts on the individual wheels is reduced and increased again intermittently, and thus discontinuously, using brake pressure control valves.

New requirements that are being made of braking functions and which improve the safety and comfort of the operation of motor vehicles, for example anti-lock brake systems, driving stability systems, traction controllers, "intelligent" driving speed controllers, have led, together with the requirement for a reduction in the assembly and maintenance costs, to the development of new, electrically controlled and actuated brake systems. See, for instance, German published patent application DE 195 29 664. Those systems greatly reduce, or entirely remove, the need for the considerable expenditure on master brake cylinders, brake pressure lines etc. in conventional brake systems.

In such an electric brake system, which is referred to as a brake by wire system, the driver is disconnected from the brake in terms of force, i.e. the braking torque request which the driver makes is no longer transferred directly as force on a hydraulic system but rather now merely an electrical signal is transmitted on an electrical line. The signal thus controls an electric brake actuator. The brake actuator is supplied with electrical energy and generates a frictional force at the individual wheel brakes, by means of which force a braking torque is built up at the respective wheel.

SUMMARY OF THE INVENTION

It is accordingly an object of the invention to provide a method and a circuit configuration which permit the braking process in motor vehicles with electric brake systems, which overcomes the above-mentioned disadvantages of the heretofore-known devices and methods of this general type and which allows controlling the system in an analogous way and, particularly, to prevent a braked wheel from locking in a sensitive and effective way.

With the foregoing and other objects in view there is provided, in accordance with the invention, a method of controlling a braking process in a motor vehicle with a plurality of wheels, which comprises:

measuring wheel speeds of at least some wheels of a motor vehicle and transmitting corresponding signals to a control unit;

calculating with the control unit a wheel slip from the signals representing the wheel speeds;

determining a correction value for a setpoint value of a wheel brake pressure the wheel slip; and continuously changing the setpoint value of the wheel brake pressure in dependence on the wheel slip with the correction value.

In accordance with an added feature of the invention, the determining step comprises obtaining the correction value from a characteristic curve defining the correction value in dependence on the wheel slip.

In accordance with an additional feature of the invention, the correction value is multiplied, as a factor, by the setpoint value of the wheel brake pressure.

In accordance with another feature of the invention, the correction value assumes a value between zero (in case of no activation of the brakes) and one (in case the brake pressure is unchanged).

In accordance with a further feature of the invention, a rate of change of the correction value which increases as the wheel slip decreases is limited.

With the above and other objects in view there is also provided, in accordance with the invention, a brake system with control of the braking process in a motor vehicle having a plurality of wheels, comprising:

wheel speed sensors disposed to measure wheel speeds of at least some wheels of a motor vehicle;

a control unit connected to receive signals from the wheel speed sensors representing the wheel speeds, the control unit calculating a wheel slip from the wheel speeds measured by the wheel speed sensors, and changing a setpoint value of a wheel brake pressure in dependence on the wheel slip, the control unit including an arithmetic circuit for determining a continuous correction value for the setpoint value of the brake pressure from the wheel slip;

a plurality of electrically actuated wheel brake actuators each assigned to a respective wheel of the motor vehicle and each connected to the control unit, the wheel brake actuators continuously adjusting a brake pressure at the wheels and individually setting the brake pressure for each wheel group formed from at least one wheel; and the control unit generating control signals for the wheel brake actuators for changing the brake pressure by means of a logic operation on the correction value.

In accordance with a concomitant feature of the invention, the correction value is stored as a characteristic curve in the control unit as a function of the wheel slip.

Other features which are considered as characteristic for the invention are set forth in the appended claims.

Although the invention is illustrated and described herein as embodied in a method and circuit configuration for controlling the braking process in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic top plan view of an electric brake system according to the invention;

FIG. 2 is a block diagram of a control unit of the brake system according to FIG. 1 with an illustration of the method according to the invention; and

DESCRIPTION OF THE PREFERRED EMBODIMENTS

Referring now to the figures of the drawing in detail and first, particularly, to FIG. 1 thereof, there is seen a brake system 1 in a motor vehicle with four wheels. The vehicle is not illustrated in any detail for reasons of clarity. The vehicle has four brakes 2, each with a brake disk 3 and an activation device in the form of a wheel brake actuator 4, also referred to as wheel brake actuator or, simply, actuator. The wheel brake actuators are integrated into, in each case, one associated brake caliper, i.e. combined with it to form a unit. The brake caliper is designed as a floating caliper, and a braking torque is exerted on the brake disk 3 by means of brake linings when the wheel brake actuator is activated. It will be understood, however, that the individual components of the brake system 1 described herein are exemplary only and may be of a different design without having any adverse affect on the invention.

The wheel brake actuators are supplied with electrical power by a battery 8 on a supply line 9. Signals from wheel speed sensors 12, which are provided at each wheel, are evaluated by an electronic control unit (ECU) 10. The signals are fed to the control unit 10 on signal lines 14.

The control unit 10 is also connected to a brake value transmitter or pedal (force) simulator 15 which is actuated by the driver of the motor vehicle by means of a pedal 16. The pedal simulator 15 converts the movement of the brake pedal 16, i.e. the force which is exerted as usual on the brake pedal by the driver, and the pedal travel which is executed in the process, into electrical signals. The actuation of the pedal is converted by means of a plurality of sensors, for example one or two displacement sensors 18 and one or two pressure sensors 19, into electrical signals which are fed on signal lines 20 to the control unit 10 and evaluated there.

The control unit 10 determines setpoint values for the actuation of the brakes from the sensor signals, and transmits said values on control lines 22 to the individual wheel brake actuators 4. In order to calculate the setpoint values for the wheel brake actuators, the control unit 10 evaluates further sensor signals, in particular the signals of the wheel speed sensors 12. Furthermore, the signals of transverse acceleration or yaw rate sensors (not illustrated here) can also be evaluated.

The wheel brake actuators can be provided on each wheel or else just on groups of wheels. They are electrically actuated or adjusted continuously and they generate an independent brake pressure for each wheel or for each group of wheels.

The control unit 10 receives, as input signals, the signals of the wheel speed sensors 12 and the signals of the displacement and force sensors 18, 19 which represent the setpoint value for the braking desired by the driver, and said control unit 10 processes these signals with a control computer 24, which is designed, for example, as a microprocessor and is schematically illustrated in the drawing (FIG. 2). On the basis of the evaluation which is to be described below, the control unit generates output signals which control the brake actuators 4 at the individual wheel brakes by means of a brake control stage 25.

The control computer 24 of the control unit 10 evaluates the signals of the wheel speed sensors 12 in a block 26 and carries out a slip calculation. The slip calculation is known per se and is described in the pertinent literature (see, for example, Manfred Burckhardt, Fahrwerktechnik: "Radschlupf-Regelsysteme" [Chassis Technology: Wheel Slip Control Systems], Vogel Verlag, 1993, pages 16 to 20).

The wheel slip $\lambda$ is determined from the wheel speeds in that, for example, a vehicle reference speed is determined from the fastest, nondriven wheel, and the slip of one wheel is calculated as a ratio between the measured wheel speed and the vehicle reference speed. In addition, for each wheel there is a desired setpoint brake pressure or a setpoint braking force which is generated as a driver's request for braking by the sensors 18, 19 or by an electronic additional brake system, for example a vehicle dynamics controller. Within the framework of the present descriptions, the expressions brake pressure and braking force are synonymous since they differ only in a fixed factor which represents the effective braking area.

If the actual setpoint brake pressure (or the setpoint brake force) exceeds a value which is dependent on the road surface, the respective wheel will lock. This locking is undesired for the reasons mentioned at the beginning and is prevented by the present braking control which reduces the actual setpoint brake pressure to such an extent that the wheel no longer locks.

The setpoint brake pressure actually applied to a brake actuator 4 is reduced as compared with the desired setpoint brake pressure generated in response to the driver's request. The setpoint brake pressure actually applied to the brake actuator 4 is obtained by applying a correction value or correction factor k, which is determined from the wheel slip $\lambda$, to the desired setpoint brake pressure. The calculation of the correction value k is carried out by the control computer 24 in a block 28. The value or factor k is applied in a simple mathematical operation, for example adding a correction value to (or subtracting it from) the desired setpoint brake pressure or else multiplying the correction value by the desired setpoint brake pressure, the operations being carried out in a block 29. The correction value k has the effect in all cases that the setpoint brake pressure applied to a brake actuator is reduced as compared to the desired setpoint brake pressure, specifically as a function of the calculated wheel slip.

If the correction value k is used as a multiplication value for the desired setpoint brake pressure, this has an absolute value between value 0 and value 1. The correction value k is a continuously changing value which is determined most easily with a characteristic curve which defines it as a function of the wheel slip. Here, k=1 for a slip $\lambda$=0, i.e. when there is no slip present, the setpoint braking pressure is not corrected. For a slip value $\lambda$=1 the correction value k=0, i.e. no braking pressure is exerted. The correction value characteristic curve can be defined by means of simple trials for the desired respective type of motor vehicle. During braking, a wheel slip of several percent is permissible without reducing the desired setpoint braking pressure, and when a possible limiting slip value is reached the correction value is quickly reduced.

As soon as the wheel slip has reached its maximum absolute value and decreases again, the correction value also rises again and the brake pressure which is to be applied by the brake actuators approaches the desired setpoint pressure again. Here, measures are to be taken to ensure that the approximation does not take place too quickly. For this reason, the rate of increase for correction factor must be limited. This can expediently be carried out by analogy with the shape of an exponential curve, which permits a rapid rise at the beginning and flattens out as the rise continues.

The correction factor k can also be determined with a predefined mathematical relationship in which further parameters, for example the vehicle speed, can also be taken into account.

The advantages of the invention lie in particular in the continuous adaptation of the setpoint value of the braking pressure to the respective slip conditions, this continuous adaptation having a favorable effect on the electric brake actuators. Mistriggering is easily avoided. Furthermore, by suitably selecting the characteristic curve or the calculation formula for the correction value, a flat profile of the control oscillations can be obtained, which gives rise to decidedly comfortable control characteristics. It is important here to calculate the wheel slip and the coefficient of friction between the tire and the road precisely, as is described in U.S. Pat. No. 6,079,801.

I claim:

1. A method of controlling a braking process in a motor vehicle with a plurality of wheels, which comprises:

measuring wheel speeds of at least some wheels of a motor vehicle and transmitting corresponding signals to a control unit;

calculating, with the control unit, a wheel slip from the signals representing the wheel speeds;

determining, from the wheel slip, a correction value for a first setpoint value of a wheel brake pressure; and continuously changing a second setpoint value of the wheel brake pressure in dependence on the wheel slip by using the correction value.

2. The method according to claim 1, wherein the determining step comprises obtaining the correction value from a characteristic curve defining the correction value in dependence on the wheel slip.

3. The method according to claim 1, which further comprises multiplying the correction value, as a factor, by the first setpoint value of the wheel brake pressure.

4. The method according to claim 1, wherein the correction value assumes a value between zero, in case of no activation of the brakes, and one, in case the brake pressure is unchanged.

5. The method according to claim 1, which comprises limiting a rate of change of the correction value which increases as the wheel slip decreases.

6. A brake system with control of the braking process in a motor vehicle having a plurality of wheels, comprising:

wheel speed sensors disposed to measure wheel speeds of at least some wheels of a motor vehicle;

a plurality of electrically actuated wheel brake actuators each assigned to a respective wheel of the motor vehicle said wheels formed into at least one wheel group, each wheel group formed from at least one wheel, said wheel brake actuators continuously adjusting and individually setting the brake pressure for each wheel group formed from at least one wheel; and a control unit connected to receive signals from said wheel speed sensors representing the wheel speeds, said control unit configured to calculate a wheel slip from the wheel speeds measured by said wheel speed sensors, and configured to change a setpoint value of the brake pressure in dependence on the wheel slip, said control unit including an arithmetic circuit for determining a continuous correction value for the setpoint value of the brake pressure from the wheel slip;

said control unit connected to said plurality of electrically actuated wheel brake actuators;

said control unit generating control signals for said wheel brake actuators for changing the brake pressure by means of a logic operation on the correction value.

7. The brake system according to claim 6, wherein the correction value is stored as a characteristic curve in the control unit as a function of the wheel slip.

* * * * *